United States Patent
Thomas

(10) Patent No.: US 9,043,909 B2
(45) Date of Patent: May 26, 2015

(54) SYSTEM AND METHOD FOR INCORPORATING QUALITY-OF-SERVICE AND REPUTATION IN AN INTRUSION DETECTION AND PREVENTION SYSTEM

(71) Applicant: Dell Products, LP, Round Rock, TX (US)

(72) Inventor: Ashley Thomas, Atlanta, GA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/012,891

(22) Filed: Aug. 28, 2013

(65) Prior Publication Data

US 2014/0007217 A1  Jan. 2, 2014

Related U.S. Application Data

(63) Continuation of application No. 13/305,149, filed on Nov. 28, 2011, now Pat. No. 8,549,612.

(51) Int. Cl.
| | |
|---|---|
| *H04L 29/14* | (2006.01) |
| *H04L 29/06* | (2006.01) |
| *H04L 12/823* | (2013.01) |
| *H04L 12/54* | (2013.01) |
| *H04L 12/873* | (2013.01) |

(52) U.S. Cl.
CPC .......... *H04L 63/0227* (2013.01); *H04L 63/126* (2013.01); *H04L 63/1441* (2013.01); *H04L 47/522* (2013.01); *H04L 47/32* (2013.01)

(58) Field of Classification Search
None
See application file for complete search history.

(56) References Cited

U.S. PATENT DOCUMENTS

| | | | |
|---|---|---|---|
| 7,865,732 B2 | 1/2011 | Sheymov | |
| 7,890,627 B1 | 2/2011 | Thomas | |
| 7,937,468 B2 | 5/2011 | Libbey et al. | |
| 7,992,206 B1 | 8/2011 | Painter et al. | |
| 2006/0161986 A1 | 7/2006 | Singh et al. | |
| 2007/0079379 A1* | 4/2007 | Sprosts et al. | 726/24 |
| 2010/0125663 A1* | 5/2010 | Donovan et al. | 709/224 |
| 2010/0125900 A1 | 5/2010 | Dennerline et al. | |
| 2010/0212010 A1* | 8/2010 | Stringer et al. | 726/22 |
| 2010/0235915 A1 | 9/2010 | Memon et al. | |
| 2010/0325588 A1* | 12/2010 | Reddy et al. | 715/853 |
| 2011/0023115 A1 | 1/2011 | Wright | |
| 2011/0023118 A1 | 1/2011 | Wright | |
| 2011/0035795 A1 | 2/2011 | Shi | |
| 2011/0145920 A1* | 6/2011 | Mahaffey et al. | 726/22 |

(Continued)

OTHER PUBLICATIONS

"IDP Series Intrusion Detection and Prevention Appliances (IDP75; IDP250, IDP800; IDP8200)," Datasheet, Juniper Networks, Dec. 2009, 1000221-004-EN.

(Continued)

*Primary Examiner* — Venkat Perungavoor
(74) *Attorney, Agent, or Firm* — Larson Newman, LLP

(57) ABSTRACT

An intrusion prevention system includes a processor, processing engines, buffers that are associated with a different range of reputation scores, and a storage device having a database and an application. The processor executes the application to determine that a firewall has admitted a packet, determine a reputation score for the packet from the database, provide the packet to a buffer that has a reputation score range that includes the reputation score of the packet, provide the packet from the buffer to a processing engine, process the packet by in the processing engine to determine if the packet includes an exploit, and forward the packet to the protected network if the first packet does not include the exploit.

17 Claims, 4 Drawing Sheets

(56) References Cited

U.S. PATENT DOCUMENTS

| | | |
|---|---|---|
| 2011/0161494 A1 | 6/2011 | McDysan et al. |
| 2011/0191849 A1 | 8/2011 | Jayaraman et al. |
| 2011/0199902 A1 | 8/2011 | Leavy et al. |
| 2013/0139245 A1 | 5/2013 | Thomas |

OTHER PUBLICATIONS

"Incorporating Quality-of-Service in Intrusion Detection and Prevision Systems," Ashley Thomas; Dell Secureworks, 2011.

iRAID: IP Reputation based Adaptive Intrusion Detection, The ACM Computing Classification Scheme; http://www.acm.org/class/1998.

"Assessing the Security Benefits of a Trusted Traveler Program in the Presence of Attempted Attacker Exploitation and Compromise," Jackson et al., National Security Research Division, WR-855-RC, May 2011.

"Intrusion Detection Systems with Napatech Adapters," © Napatech, 2011, A/S, http://www.napatech.com/uploads/c_file/112_file_6076.pdf.

\* cited by examiner

SYSTEM AND METHOD FOR INCORPORATING QUALITY-OF-SERVICE AND REPUTATION IN AN INTRUSION DETECTION AND PREVENTION SYSTEM

CROSS REFERENCE TO RELATED APPLICATIONS

This application is a continuation of U.S. patent application Ser. No. 13/305,149, entitled "System and Method for Incorporating Quality-of-Service and Reputation in an Intrusion Detection and Prevention System," filed on Nov. 28, 2011, the disclosure of which is hereby expressly incorporated by reference in its entirety.

FIELD OF THE DISCLOSURE

The present disclosure generally relates to information handling systems, and more particularly relates to incorporating quality-of-service and reputation in an intrusion detection and prevention system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
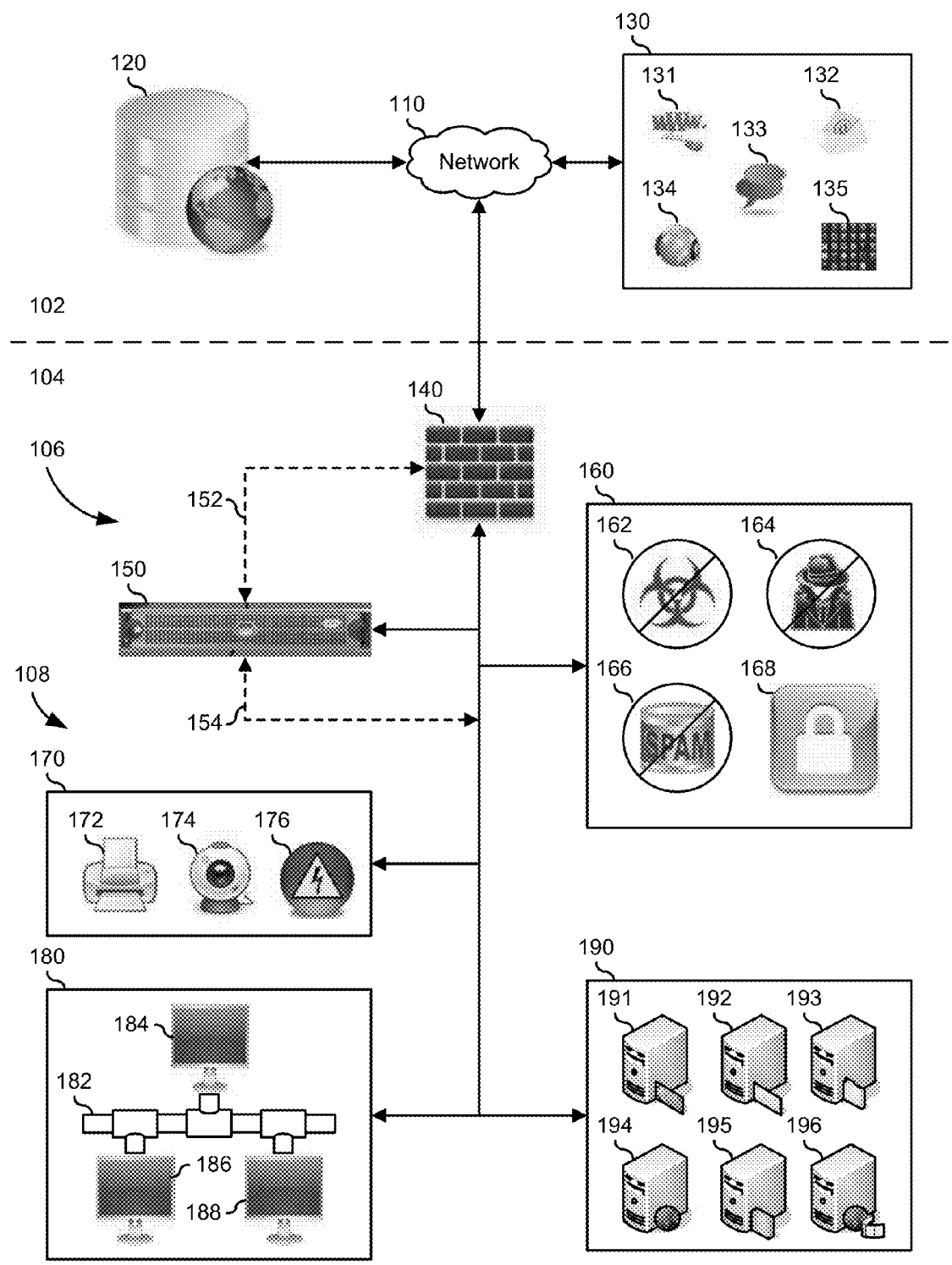
FIG. 1 is a block diagram illustrating a secure network according to an embodiment of the present disclosure.

FIG. 1 illustrates a secure network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, secure network 100 includes an external network 102 and a protected network 104. External network 102 includes a network cloud 110 that provides connectivity to protected network 104, to a reputation database 120 and to resources 130 of the external network. The resources include a website 131, an electronic mail (e-mail) system 132, an individual messaging or chat service 133, a voice-over-Internet protocol (VoIP) service 134, and a content and application service 135. Resources 130 can include other websites, services, or systems as needed or desired.

Protected network 104 includes a protection system 106 and a functional system 108. Protection system 106 includes a firewall 140, an intrusion detection/prevention system (IDPS) 150, and protection utilities 160. Functional system 108 includes network attached devices 170, a user network 180, and network servers 190. Firewall 140 operates to permit or deny network transactions based upon a set of rules, including packet filtering rules, application filtering rules, stateful packet inspection rules, identity based rules, or other rules, as needed or desired. Firewall 140 also operates to provide network address translation (NAT) to hide the identities of the other elements of protected network 104. IDPS 150 operates to monitor activities within protected network 104 for malicious activities or policy violations, to report and log information about such activities, and to prevent the malicious activities and policy violations. As such, IDPS 150 examines transactions on protected network 104, identifies heuristics and patterns of known attacks (called malicious signatures), alerts an operator of protected network 104 of the attacks, and terminates the attacks on the protected network. Thus IDPS 150 can operate to receive transactions from external network 102 and that have been screened by firewall 140, and make further determinations as to whether to admit the transaction onto protected network 104 or to drop the transactions. IDPS 150 further receives transactions from functional system 108 and determines whether to admit the transaction onto external network 102 or to drop the transactions. Note that the transactions evaluated by IDPS 150 can also be internal transactions, such as transactions with destination addresses that are within protected network 104. Protection utilities 160 include anti-virus software 162, anti-spyware software 164, anti-spam software 166, and a transport layer security/secure socket layer (TLS/SSL) 168. Protection utilities 160 can also include other protection systems as needed or desired.

Network attached devices 170 include a network attached printer 172, a network attached camera 174, and a network attached uninterruptible power supply 176. Network attached devices 170 can also include other network attached devices, such as one or more additional printers, cameras, or uninterruptible power supplies, or other network attached devices as needed or desired. User network 180 includes a network system 182, and user systems 184, 186, and 188. Network system 182 can include a local area network, a wide area network, a wireless area network, or another network system. User systems 184, 186, and 188 can include information handling systems, such as desktop or laptop computers, thin clients, mobile devices, smart phones, other user systems, or a combination thereof. Network servers 190 include an electronic commerce (e-commerce) server 191, an e-mail server 192, a file server 193, a web server 194, a proxy server 195, and a media server 196. Network servers 190 can include other network servers, as needed or desired. In a particular embodiment, network servers 190 represent different functions that are performed on one or more information handling systems, and can include virtual servers in a managed environment. Moreover, one or more of e-commerce server 191, e-mail server 192, file server 193, web server 194, proxy server 195, and media server 196 can be implemented in a de-militarized zone that includes a sub-network that is exposed to external network 102, and that is isolated from protected network 104.

In operation, protection system 106 ensures that the operations performed in functional system 108 are reliable, safe, and free from external and internal threats, and that access to the resources of protected network 104 is granted only to authorized users and according to established access rules. For example, firewall 140 can include rules to block user systems 184, 186, and 188 from accessing certain Internet protocol (IP) addresses or from using certain transmission control protocol (TCP) and user datagram protocol (UDP) ports, and rules to prevent such IP addresses and ports from accessing the elements of protected network 104. Such rules can be established based upon the existence of known threats that emanate from such IP addresses or that use such ports. IDPS 150 can include signatures of known exploits, and can monitor transactions that are permitted onto protected network 104 by firewall 140. For example, a file received from an IP address that is deemed to be safe by firewall 140 may nevertheless include a known exploit, such as a virus or Trojan. When IDPS 150 detects transactions that match a signature associated with a known exploit, then the IDPS blocks the transaction from reaching its destination, such as by dropping the network packets associated with the transaction. In a particular embodiment, IDPS 150 provides hardware functionality, such as the ability to monitor transactions, in combination with software functionality such as signature based anti-virus, anti-malware, anti-spam, and TLS/SSL functionality. As such, anti-virus software 162, anti-spyware software 164, anti-spam software 166, and TLS/SSL 168 can represent capabilities that are included in IDPS 150. In another embodiment, anti-virus software 162, anti-spyware software 164, anti-spam software 166, and TLS/SSL 168 provide functionality complimentary to IDPS 150.

The elements of protected network 104 include hardware, such as one or more information handling systems, dedicated peripheral devices, or other hardware, as needed or desired, and also include software, such as stand-alone software products, firmware or middleware products associated with particular hardware devices, basic functional software of an information handling system, such as a platform basic input/output system (BIOS) or an extensible firmware interface (EFI), or other software, as needed or desired. The landscape of hardware and software in protected network 104 is constantly changing, as hardware devices are added or replaced, firmware and middleware for the hardware devices is added or updated, software products are added or updated, or other hardware and software of the protected network are added, removed, or updated. As a result of the changing landscape of protected network 104, the functions of protection system 106 need to be updated and modified to ensure that all aspects of the changing landscape continue to be protected. In addition to the changing landscape of protected network 104, the threat environment is constantly changing as weaknesses are discovered in the protection offered by protection system 106, and as security holes are found in the hardware and software of protected network 104 and are exploited. For example, new viruses, Trojans, malware, spyware, and other exploits are constantly being developed to take advantage of any weakness or security hole. In addition, hacking activity can also be targeted at weaknesses and security holes.

As new IP addresses are identified with known exploits, the operator can update the rules in firewall 140 to block access to these IP addresses, new signatures can be provided to IDPS 150 to detect and prevent newly discovered exploits, and new definition files can be added to anti-virus system 162 to detect newly discovered viruses and Trojans. Also, hardware and software settings can be updated within functional system 108 to provide greater security.

In a particular embodiment, IDPS 150 provides for host intrusion prevention through behavioral based protection, which guards against unknown threats by analyzing behavior before software code executes. Behavioral based protection monitors code when it runs and intervenes if the code is deemed to include an exploit. As such, behavioral based protection deletes code that includes an exploit before the code reaches the elements of functional network 108. In another embodiment, IDPS 150 provides for quality-of-service (QoS) based protection, which utilizes various QoS information in the headers of packets and frames received by protected network 104 to determine the scope and timing of screening and analysis of the associated network flows. In another embodiment, IDPS 150 provides reputation based filtering, which targets sources of known exploits for more rigorous screening and analysis, based upon a reputation score received from reputation database 120. For example, reputation database 120 can include lists of universal resource locators (URLs) of known sources of exploits, known suspicious IP addresses or domains, sources of spam, malware, viruses, or other known exploits that have been received from different sources in the past. When packets from a source with a lower reputation score are received, IDPS 150 may take some action to protect protected network 104. Further, IDPS 150 can block outgoing packets from functional system 108 from being sent to URLs, IP addresses, domains, sources of spam, malware, viruses, or other known exploits that have a low reputation score.

Reputation database 120 can represent a facility operated by the manufacturer of IDPS 150, by the operator of protected network 104, by a third party reputation database vendor, or by another person or entity, as needed or desired. In a particular embodiment, reputation information is sent from IDPS 150 back to reputation database 120, based upon reputation analysis done by the IDPS for information received by protected network 104, thereby improving the performance of the reputation database. For example, the types, times, and number of virus interactions that are experienced by protected network 104 can provide useful information for the prevention of future threats. This type of feedback may be useful for any aspect of threat detection. Feedback of information may also be associated with behaviors of individuals within protected network 104, such as behaviors that are with common violations of policy, network access, unauthorized application loading, unauthorized external device use, and the like. In another embodiment, this type of information feedback may enable the evaluation or profiling of client actions within protected network 104 that are violations of policy that may provide a predictive model for the improvement of enterprise policies. Examples of such enterprise policies include a black list, an allowed list, a white list, or the like that provide lists of external network 102 locations/applications that may or may not be accessed by client in protected network 104.

Figure 2:
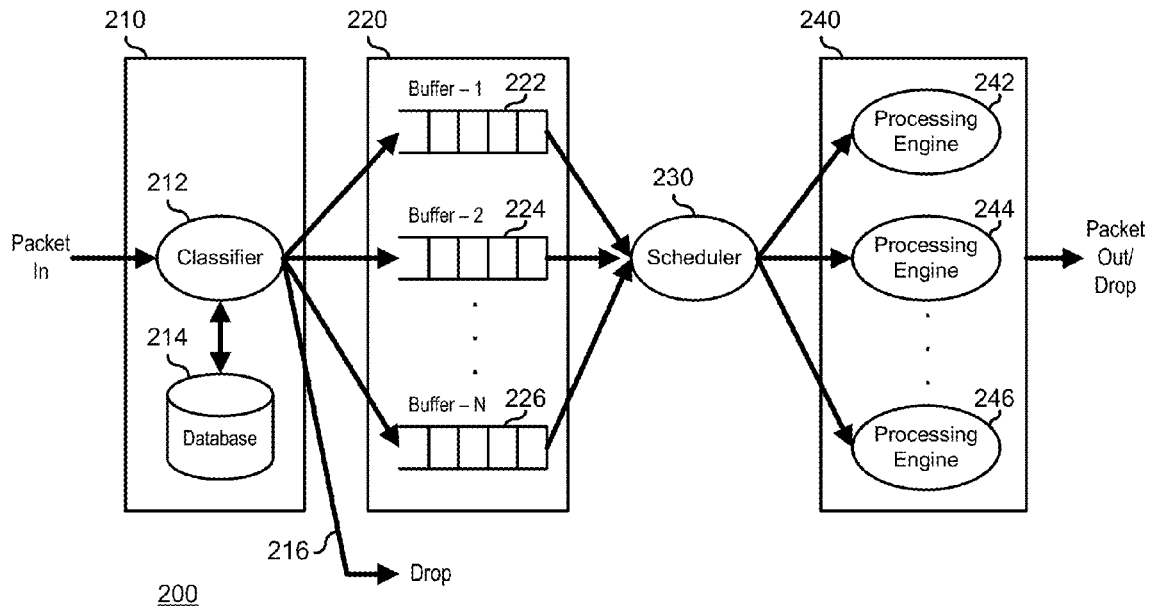
FIG. 2 is a block diagram illustrating an intrusion detection and prevention system according to an embodiment of the present disclosure.

FIG. 2 illustrates an IDPS 200 that is similar to IDPS 150, and includes a classification block 210, a buffer block 220, a scheduler 230, and a processing block 240. Classification block 210 includes a classifier 212 and a database 214. Database 214 is shown here as a part of IDPS 200. However, in a particular embodiment, database 214 is external to IDPS 200, similar to reputation database 120. In another embodiment, database 214 is an extension of reputation database 120, including a subset of the reputation information that is found in the reputation database. For example, the subset of reputation information can include information on websites, IP addresses, email servers, and the like, that are frequently encountered and that have a reputation for being the source of frequent exploits. Here, reputation database 120 can include a more extensive listing that includes less commonly encountered sources of exploits.

Buffer block 220 includes buffers 222, 224, and 226. Processing block 240 includes processing engines 242, 244, and 246. In operation, IDPS 200 receives packets at classification block 210. The packets are classified by the classifier, based upon information in the packet and information associated with the reputation of the source of the packets, as determined by database 214. If the packet is associated with a source that has a reputation that is below a bottom threshold, the packet is immediately dropped as indicated by arrow 216. If the packet is associated with a source that has a reputation that is above the bottom threshold, the packet is provided to one of buffers 222, 224, or 226 to be further processed. Buffers 222, 224, and 226 operate on a first-in-first-out basis. When a packet is at the head of its respective buffer 222, 224, or 226, scheduler 230 schedules the packet for processing by a next available processing engine 242, 244, or 246.

Processing engines 242, 244, and 246 provide for the analysis of the packets to determine a response to the packets. For example, processing engines 242, 244, and 246 can determine that packets include known exploits and that the packets should be dropped. Processing engines 242, 244, and 246 can also determine that packets include potential exploits and that a network administrator should be notified of the packets to make a determination as to how to handle them. Processing engines 242, 244, and 246 can further determine that packets include no exploits and that the packets can be safely forwarded to their destination.

The information received by classifier 212 includes packets, frames, network flows, or other information as needed or desired, and is received from external network 102 after being passed through firewall 140, or from other elements of protected network 104. In a particular embodiment, classifier 212 determines a QoS level for the packets received by classification block 210. For example, classifier 212 can inspect a type-of-service (ToS) field of an IPv4 header to determine if the packet is a network control packet that receives a highest priority, a routine packet that receives a lowest or best-effort priority, or is a packet with a priority level in between network control and routine. In another example, classifier 212 can inspect for a QoS level according to another QoS protocol, such as IP Differentiated services (DiffServ), IP Integrated services (IntServ), Multi-Protocol Label Switching (MPLS), another type of QoS protocol, or a combination thereof, as needed or desired. Here, one or more of buffers 222, 224, and 226 are associated with different QoS levels, and packets with the associated QoS level are queued into the associated buffer. For example, buffer 222 can be associated with network control packets and internetwork control packets that have a ToS level of seven and six, respectively, and buffer 226 can be associated with routine packets that have a ToS level of zero. Here further, scheduler 230 can schedule packets in the buffers 222, 224, and 226 according to a scheduling algorithm such as weighted fair queuing (WFQ), weighted round robin (WRR), hierarchical fair service curve (HFSC), or another scheduling algorithm, as needed or desired. In this embodiment, processing engines 242, 244, and 246 each provide a uniform analysis of the packets, and priority of analysis is based upon the action of scheduler 230 to schedule the packets from buffers 222, 224, and 226 into the processing engines. In this way, packets with a higher QoS level can be given priority by scheduler 230, thus ensuring that higher priority packets are preferentially processed through IDPS 200.

In another embodiment, classifier 212 provides source information for the received packets to database 214 to determine a reputation level for the source of the received packets. As described above, if a packet is associated with a source that has a reputation that is below the bottom threshold, the packet is immediately dropped as indicated at 216, and otherwise the packet is provided to one of buffers 222, 224, or 226 to be further processed. In addition, the packet may be classified as having a reputation level that is in one or more ranges that are above the bottom threshold. For example, a source of packets can be given a reputation score between zero and ten, and the bottom threshold can be set at a reputation score of three. Here any packets with a reputation score of less than three can be immediately dropped. A second threshold can be set at a reputation score of nine, such that packets with reputation scores between four and eight are deemed to be questionable, and packets with reputation scores of nine or ten are deemed to be trusted. With the reputation level determined by database 214, classifier 212 queues the packets into a particular buffer 222, 224, or 226 that is associated with each reputation level. For example, buffer 222 can be associated with trusted packets with a reputation score of nine or ten, and buffer 224 can be associated with questionable packets with a reputation score between four and eight. Here, as in the above embodiment, scheduler 230 can schedule packets in the buffers 222, 224, and 226 according to a scheduling algorithm such as WFQ, WRR, HFSC, or another scheduling algorithm, as needed or desired, and processing engines 242, 244, and 246 each provide a uniform analysis of the packets, and priority of analysis is based upon the action of scheduler 230 to schedule the packets from buffers 222, 224, and 226 into the processing engines. In this way, packets with a higher reputation score can be given priority by scheduler 230, thus ensuring that more highly trusted packets are preferentially processed through IDPS 200. It should be understood that the above description of threshold levels is exemplary, and that more threshold levels or fewer threshold levels can be utilized as needed or desired, and that the number of buffers 222, 224, 226, and of processing engines 242, 244, and 246 can be increased or decreased as needed or desired.

In another embodiment packets are processed based upon the packets' QoS level and the packets' source reputation. Here classifier 212 can queue packets into buffers 222, 224, and 226 based upon both the QoS level of the packets, and the source reputation of the packets. For example, classifier 212 can queue control packets and internetwork control packets that have a ToS level of seven and six, respectively, and that are also received from a source that has reputation score of nine or ten into buffer 222, and can queue control packets and internetwork control packets that have a ToS level of seven and six, respectively, and that are also received from a source that has reputation score between four and eight into buffer 224.

Figure 3:
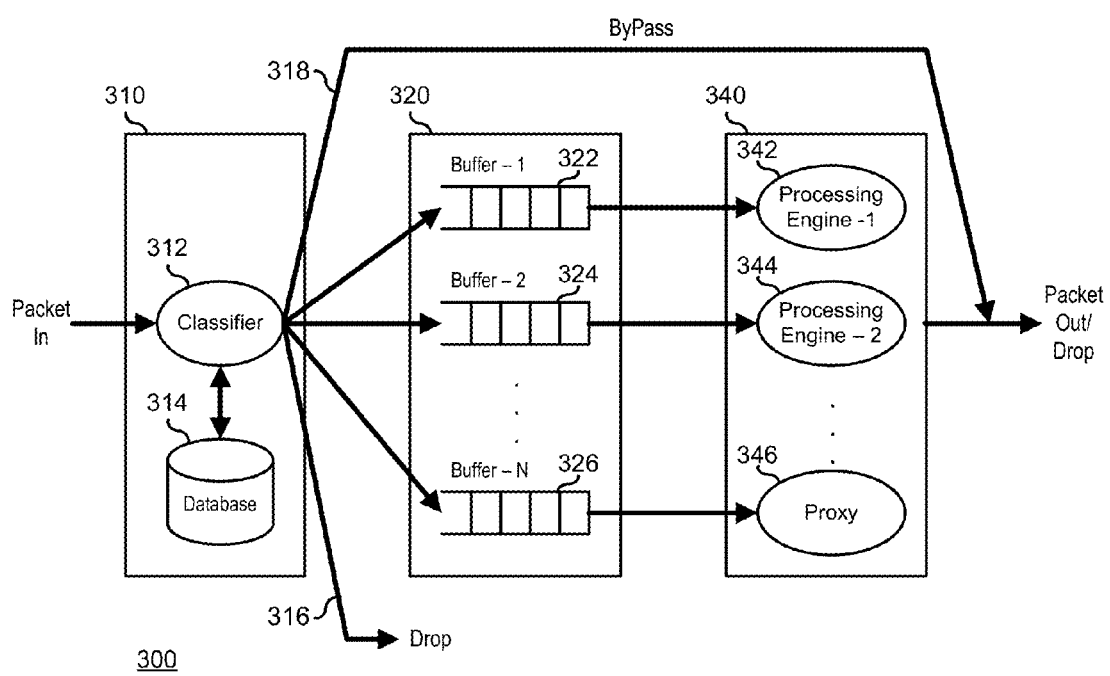
FIG. 3 is a block diagram illustrating another intrusion detection and prevention system according to an embodiment of the present disclosure.

FIG. 3 illustrates an IDPS 300 that is similar to IDPS 150 and IDPS 200, and includes a classification block 310, a buffer block 320, and a processing block 340. Classification block 310 includes a classifier 312 and a database 314. Database 314 is similar to database 214. Buffer block 320 includes buffers 322, 324, and 326. Processing block 340 includes processing engines 342, and 344, and proxy 346. In receiving packets and classifying the packets into buffer block 320, IDPS 300 operates similarly to IDPS 200, and buffers 322, 324, and 326 operate on a first-in-first-out basis. However, in IDPS 300, classifier 312 can also provide a bypass 318 to processing for selected packets. For example, classifier 312 can provide that packets that are received from sources that have a reputation score of ten are directly forwarded to their destination, thereby bypassing further processing by IDPS 300, and also freeing up processing resources for the analysis of packets from sources with lower reputation scores. Moreover, in IDPS 300, when a packet is at the head of its respective buffer 322, 324, or 326, the packet is provided to an associated processing engine 342 or 344, or proxy 346. As such, processing engines 342 and 344 each provide different levels of analysis of the packets provided thereto. For example, classifier 312 can provide that packets that are received from sources that have a reputation score of nine are queued into buffer 322, and associated processing engine 342 can provide for a reduced analysis. Packets that are received from sources that have a reputation score between six and eight can be queued into buffer 324, and associated processing engine 344 can provide for a more extensive analysis. Packets that are received from sources that have a reputation score of four or five can queued into buffer 326, and can be directed to proxy 346 for separate handling, such as a more in-depth but computationally expensive analysis.

In another embodiment, classifier 312 determines a QoS level for the packets received by classification block 310, and one or more of buffers 322, 324, and 326 are associated with different QoS levels, and packets with the associated QoS level are queued into the associated buffer. In this embodiment, processing engines 342 and 344, and proxy 346 each provide analysis of the packets with the associated QoS level. In another embodiment packets are processed based upon the packets' QoS level and the packets' source reputation. Here classifier 312 can queue packets into buffers 322, 324, and 326 based upon both the QoS level of the packets, and the source reputation of the packets. In another embodiment, processing engines 342 and 344, and proxy 346 can be made up of two or more similar processing engines or proxies, and IDPS 300 can include a scheduler similar to scheduler 230 for each of buffers 322, 324, and 326. Here, a packet that is at the head of a buffer can be provided to a next available processing engine or proxy. As noted above, it should be understood that IDPS 300 can utilize reputation score thresholds, and that the number of buffers 322, 324, 326, of processing engines 342 and 344, and proxy 346 can be increased or decreased as needed or desired. As such, IDPS 300 can implement a quality of security analysis (QoSA) for packets received by classification block 310, such that packets received are classified into reputation levels, or QoSA levels, that are associated with respective buffers 322, 324, and 326.

Figure 4:
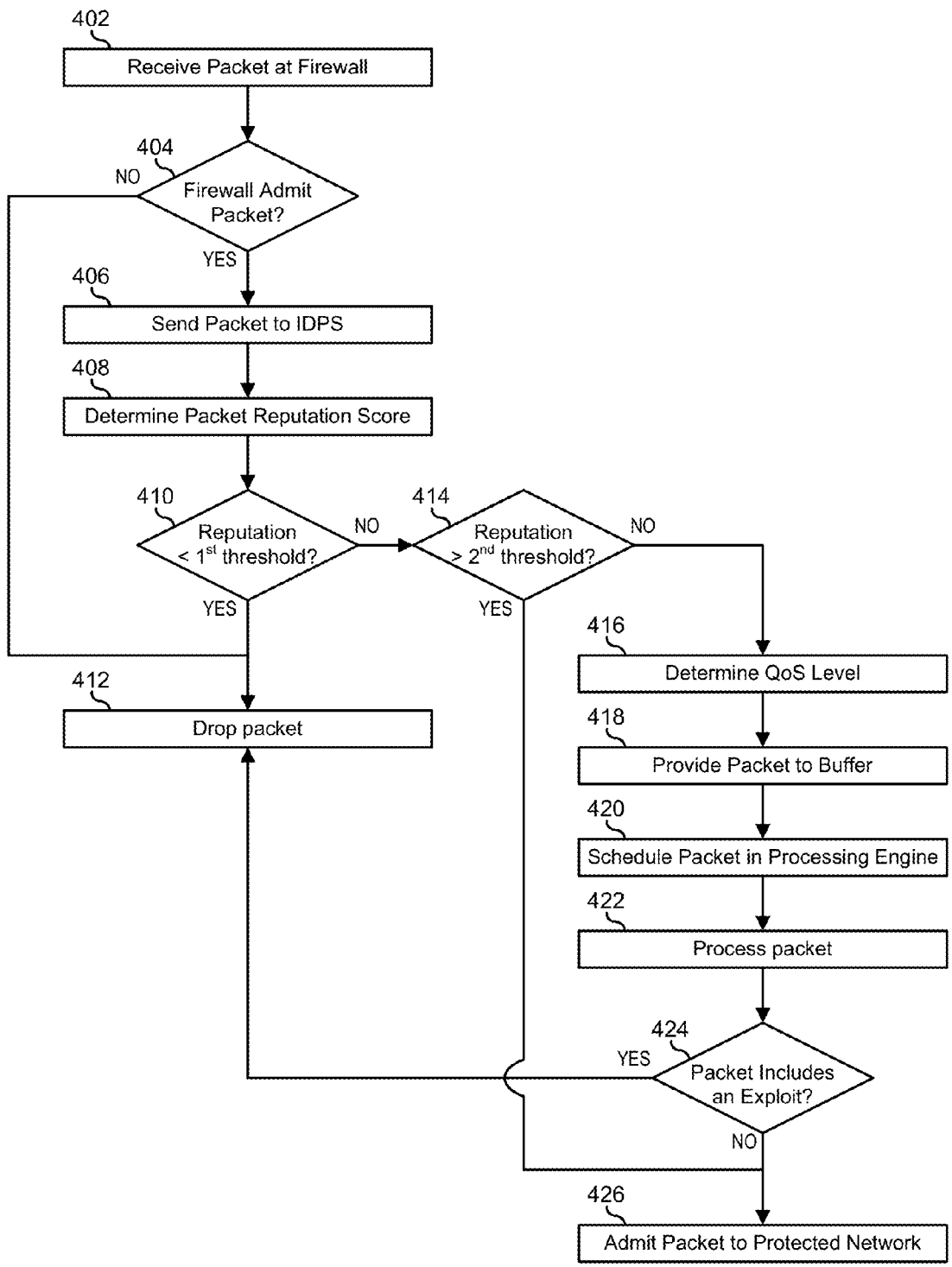
FIG. 4 is a flowchart illustrating a method of incorporating quality-of-service and Internet protocol reputation in an intrusion detection and prevention system, according to an embodiment of the present disclosure.

FIG. 4 illustrates a method of incorporating quality-of-service and Internet protocol reputation in an intrusion detection and prevention system, beginning at block 402 where a packet is received at a firewall. For example, firewall 140 can receive a packet from external network 102. A decision is made at the firewall as to whether or not to admit the packet onto a network protected by the firewall at decision block 404. Thus firewall 140 can include rules to screen out packet that have a specified source address or other rules. If the packet is not admitted onto the protected network by the firewall, the "NO" branch of decision block 404 is taken, and the packet is dropped from the protected network in block 412. For example, the packet can be from a source address that is associated with a blacklist of firewall 140. If the packet is admitted onto the protected network by the firewall, the "YES" branch of decision block 404 is taken, and the packet is sent to an IDPS in block 406, and a reputation score is determined for the packet in block 408. For example, the packet can be from a source address that is associated with a whitelist of firewall 140, and the firewall can forward the packet to an IDPS such as IDPS 150. IDPS 150 can retrieve a reputation score from reputation database 120, or from a database similar to databases 214 or 314.

A decision is made as to whether or not the reputation score of the packet is less than a first threshold value in decision block 410. For example, classifier 212 can determine if the reputation score for the packet is greater than or less than the bottom threshold. If so, the "YES" branch of decision block 410 is taken, and the packet is dropped from the protected network in block 412. Thus classifier 212 can drop 216 the packet when the reputation score is less than the bottom threshold. If the reputation score of the packet is not less than the first threshold value, the "NO" branch of decision block 410 is taken, and a decision is made as to whether or not the reputation score of the packet is greater than a second threshold value in decision block 414. For example, classifier 312 can determine if the reputation score for the packet is greater than or less than the top threshold. If so, the "YES" branch of decision block 414 is taken, and the packet is admitted to the protected network in block 426. Thus classifier 312 can bypass 318 further processing of the packet when the reputation score is greater than the top threshold. If the reputation score of the packet is not greater than the second threshold value, the "NO" branch of decision block 414 is taken, and a QoS level for the packet is determined in block 416. For example, classifier 212 can determine the QoS level for the packet. The packet is provided to a buffer that is associated with a range of reputation scores and a range of QoS levels in block 418, based on the reputation score and the QoS level of the packet. Here the packet can be provided by classifier 212 to one of buffers 222, 224, or 226, based upon the reputation score and the QoS level of the packet. The packet is scheduled into a processing engine when the packet is at the head of the buffer in block 420. For example, scheduler 230 can schedule the packet to the next available of processing engines 242, 244, or 246. In an alternative embodiment, the packet is provided to a processing engine that is associated with the buffer with the range of reputation scores and the range of QoS levels that includes the reputation score and the QoS level of the packet. For example, when the packet reaches the head of one of buffers 322, 324, or 326, the packet can be provided to the respective processing engines 342 or 344, or proxy 346.

The processing engine processes the packet to determine if the packet includes an exploit in block 422. For example, processing engine 242 can process the packet to determine if the packet includes an exploit. A decision is made as to whether or not the packet includes an exploit in decision block 424. If so, the "YES" branch of decision block 424 is taken and the packet is dropped from the protected network in block 412. If the packet does not include an exploit, the "NO" branch of decision block 424 is taken and the packet is admitted to the protected network in block 426. Here processing engine 242 can drop the packet or admit the packet based upon whether or not the packet includes an exploit. It should be understood that the method describe herein is exemplary, and that more than two threshold values (i.e., the first threshold value and the second threshold value) can be incorporated into the method as needed or desired. In a particular embodiment, the decisions made in decision blocks 410 and 414 can be based upon a determination of a QoSA level of the received packet, and can represent multiple decision blocks that classify the received packet into a buffer associated with the QoSA level of the received packet.

Figure 5:
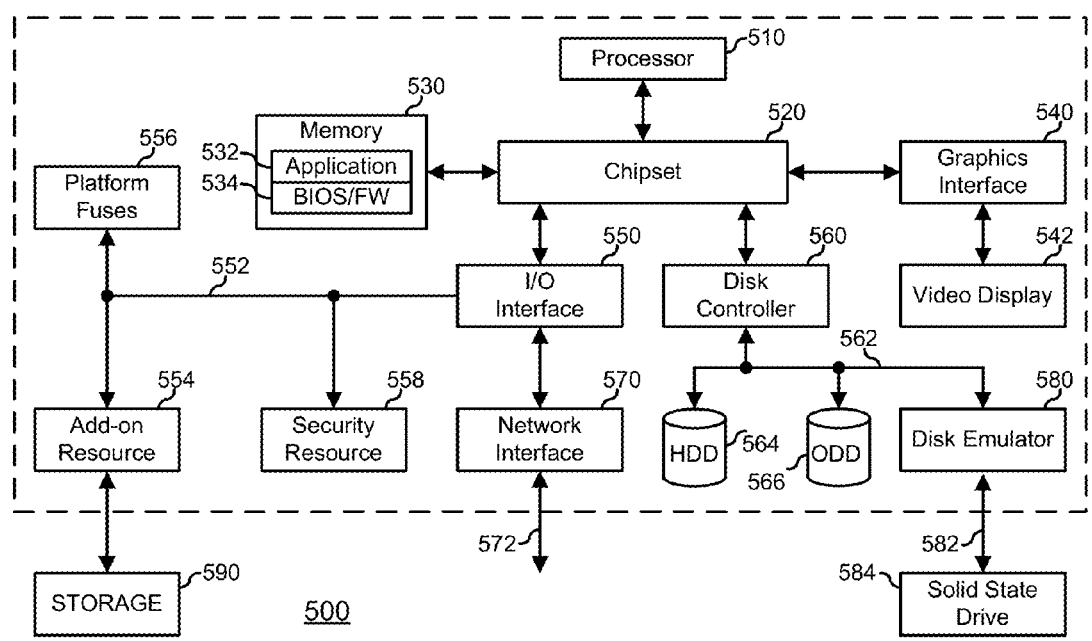
FIG. 5 is a block diagram illustrating an information handling system according to an embodiment of the present disclosure.

FIG. 5 is a block diagram illustrating an embodiment of an information handling system 500, including a processor 510, a chipset 520, a memory 530, a graphics interface 540, an input/output (I/O) interface 550, a disk controller 560, a network interface 570, and a disk emulator 580. In a particular embodiment, information handling system 500 is used to carry out one or more of the methods described herein. In another embodiment, one or more of the systems described herein are implemented in the form of information handling system 500.

Chipset 520 is connected to and supports processor 510, allowing the processor to execute machine-executable code. In a particular embodiment (not illustrated), information handling system 500 includes one or more additional processors, and chipset 520 supports the multiple processors, allowing for simultaneous processing by each of the processors and permitting the exchange of information among the processors and the other elements of the information handling system. Chipset 520 can be connected to processor 510 via a unique channel, or via a bus that shares information among the processor, the chipset, and other elements of information handling system 500.

Memory 530 is connected to chipset 520. Memory 530 and chipset 520 can be connected via a unique channel, or via a bus that shares information among the chipset, the memory, and other elements of information handling system 500. In another embodiment (not illustrated), processor 510 is connected to memory 530 via a unique channel. In another embodiment (not illustrated), information handling system 500 includes separate memory dedicated to each of the one or more additional processors. A non-limiting example of memory 530 includes static random access memory (SRAM), dynamic random access memory (DRAM), non-volatile random access memory (NVRAM), read only memory (ROM), flash memory, another type of memory, or any combination thereof.

Graphics interface 540 is connected to chipset 520. Graphics interface 540 and chipset 520 can be connected via a unique channel, or via a bus that shares information among the chipset, the graphics interface, and other elements of information handling system 500. Graphics interface 540 is connected to a video display 542. Other graphics interfaces (not illustrated) can also be used in addition to graphics interface 540 as needed or desired. Video display 542 includes one or more types of video displays, such as a flat panel display, another type of display device, or any combination thereof.

I/O interface 550 is connected to chipset 520. I/O interface 550 and chipset 520 can be connected via a unique channel, or via a bus that shares information among the chipset, the I/O interface, and other elements of information handling system 500. Other I/O interfaces (not illustrated) can also be used in addition to I/O interface 550 as needed or desired. I/O interface 550 is connected via an I/O interface 552 to one or more add-on resources 554. Add-on resource 554 is connected to a storage system 590, and can also include another data storage system, a graphics interface, a network interface card (NIC), a sound/video processing card, another suitable add-on resource or any combination thereof. I/O interface 550 is also connected via I/O interface 552 to one or more platform fuses 556 and to a security resource 558. Platform fuses 556 function to set or modify the functionality of information handling system 500 in hardware. Security resource 558 provides a secure cryptographic functionality and includes secure storage of cryptographic keys. A non-limiting example of security resource 558 includes a Unified Security Hub (USH), a Trusted Platformn Module (TPM), a General Purpose Encryption (GPE) engine, another security resource, or a combination thereof.

Disk controller 560 is connected to chipset 520. Disk controller 560 and chipset 520 can be connected via a unique channel, or via a bus that shares information among the chipset, the disk controller, and other elements of information handling system 500. Other disk controllers (not illustrated) can also be used in addition to disk controller 560 as needed or desired. Disk controller 560 includes a disk interface 562. Disk controller 560 is connected to one or more disk drives via disk interface 562. Such disk drives include a hard disk drive (HDD) 564, and an optical disk drive (ODD) 566, and can include one or more disk drive as needed or desired. ODD 566 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 560 is connected to disk emulator 580. Disk emulator 580 permits a solid-state drive 584 to be coupled to information handling system 500 via an external interface 582. External interface 582 can include industry standard busses such as USB or IEEE 1394 (Firewire) or proprietary busses, or any combination thereof. Alternatively, solid-state drive 584 can be disposed within information handling system 500.

Network interface device 570 is connected to I/O interface 550. Network interface 570 and I/O interface 550 can be coupled via a unique channel, or via a bus that shares information among the I/O interface, the network interface, and other elements of information handling system 500. Other network interfaces (not illustrated) can also be used in addition to network interface 570 as needed or desired. Network interface 570 can be a network interface card (NIC) disposed within information handling system 500, on a main circuit board such as a baseboard, a motherboard, or any combination thereof, integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Information handling system 500 includes one or more application programs 532, and Basic Input/Output System and Firmware (BIOS/FW) code 534. BIOS/FW code 534 functions to initialize information handling system 500 on power up, to launch an operating system, and to manage input and output interactions between the operating system and the other elements of information handling system 500. In a particular embodiment, application programs 532 and BIOS/FW code 534 reside in memory 530, and include machine-executable code that is executed by processor 510 to perform various functions of information handling system 500. In another embodiment (not illustrated), application programs and BIOS/FW code reside in another storage medium of information handling system 500. For example, application programs and BIOS/FW code can reside in HDD 564, in a ROM (not illustrated) associated with information handling system 500, in an option-ROM (not illustrated) associated with various devices of information handling system 500, in storage system 590, in a storage system (not illustrated) associated with network channel 572, in another storage medium of information handling system 500, or a combination thereof. Application programs 532 and BIOS/FW code 534 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    determining by a firewall whether a first packet should be admitted to a protected network;
    receiving at an intrusion prevention system of the protected network a first reputation score for the first packet based upon a first source of the first packet, wherein the firewall is different from the intrusion protection system, and wherein the first reputation score is provided from a database of the intrusion prevention system;
    providing the first packet to a first one of a plurality of buffers of the intrusion prevention system, wherein each buffer is associated with a different range of reputation scores, and wherein the first reputation score for the first packet is within the range of reputation scores associated with the first buffer;
    processing the first packet by a first one of a plurality of processing engines to determine if the first packet includes an exploit;
    forwarding the first packet to the protected network when the first packet does not include the exploit;
    determining by the firewall whether a second packet should be admitted to the protected network;
    receiving at the intrusion prevention system a second reputation score for the second packet based upon a second source of the second packet; and
    bypassing the buffers in response to the second reputation score being greater than a first threshold, and forwarding the second packet to the protected network without processing the second packet by any of the processing engines.

2. The method of claim 1, wherein:
providing the first packet to the first buffer is in further response to determining that the first reputation score is less than the first threshold and greater than a second threshold; and
the method further comprises dropping the first packet when the first reputation score is lower than the second threshold.

3. The method of claim 1, further comprising:
determining by the firewall whether a third packet should be admitted to the protected network;
receiving at the intrusion prevention system a third reputation score for the third packet based upon a third source of the third packet;
providing the third packet to a second one of the buffers, wherein the third reputation score for the third packet is within the range of reputation scores associated with the second buffer;
processing the third packet by a second one of the processing engines to determine if the third packet includes an exploit;
forwarding the third packet to the protected network when the third packet does not include the exploit.

4. The method of claim 3, wherein:
the first packet is provided to the first processing engine when a scheduler determines that the first processing system is a first available processing engine; and
the third packet is provided to the second processing engine when the scheduler determines that the second processing system is a third available processing engine.

5. The method of claim 3, wherein:
the first processing engine is associated with the first buffer; and
the second processing engine is associated with the second buffer.

6. The method of claim 5, wherein the first processing engine and the second processing engines provide different intrusion prevention processing.

7. The method of claim 1, wherein the first reputation score is provided to the database from a reputation service.

8. The method of claim 1, wherein:
each buffer is associated with a different range of quality of services of a plurality of quality of service; and
providing the first packet to the first buffer is in further response to determining that the first packet has a first quality of service, wherein the first quality of service is within the range of quality of services associated with the first buffer.

9. The method of claim 8, further comprising:
determining by the firewall whether a third packet should be admitted to the protected network;
receiving at the intrusion prevention system a third reputation score for the third packet based upon a second source of the second packet;
in response to determining that the third packet has a second quality of service, providing the third packet to a second one of the buffers, wherein the third packet is provided to the second buffer when the third reputation score is within the range of reputation scores associated with the second buffer and when the second quality of service is within the range of quality of services associated with the second buffer;
providing the third packet to a third one of the processing engines;
processing the third packet by the third processing engine to determine if the third packet includes the exploit; and
forwarding the third packet to the protected network when the third packet does not include the exploit.

10. An intrusion prevention system comprising:
a processor;
a plurality of processing engines;
a plurality of buffers, wherein each buffer is associated with a different range of reputation scores; and
a storage device including:
a database; and
an application;
wherein the processor is operable to execute the application to:
determine that a firewall has admitted a first packet;
determine a first reputation score for the first packet based upon a first source of the first packet, wherein the reputation score is received from the database;
provide the first packet to a first one of the buffers when the first reputation score is within the range of reputation scores associated with the first buffer;
process the first packet in the first processing engine to determine if the first packet includes an exploit;
forward the first packet to the protected network when the first packet does not include the exploit;
determine that the firewall has admitted a second packet;
determine a second reputation score for the second packet based upon a second source of the second packet;
bypass the buffers when the second reputation score is greater than a first threshold; and
forward the second packet to the protected network without processing the second packet by any of the processing engines;
wherein:
providing the first packet to the first buffer is in further response to determining that the first reputation score is less than the first threshold and greater than a second threshold; and
the processor is further operable to execute the application to drop the first packet when the first reputation score is lower than the second threshold.

11. The intrusion prevention system of claim 10, wherein the processor is further operable to execute the application to:
determine that the firewall has admitted a third packet to the protected network;
determine a third reputation score for the third packet based upon a third source of the second packet;
provide the third packet to a second one of the buffers when the third reputation score is within the range of reputation scores associated with the second buffer;
process the third packet in the second processing engine to determine if the third packet includes the exploit; and
forward the third packet to the protected network if the third packet does not include the exploit.

12. The intrusion prevention system of claim 11, further comprising a scheduler, and wherein:
the first packet is provided to the first processing engine when the scheduler determines that the first processing system is a first available processing engine.

13. The intrusion prevention system of claim 11, wherein:
the first processing engine is associated with the first buffer; and
the second processing engine is associated with the second buffer.

14. A non-transitory computer readable medium including code for performing a method, the method comprising:

determining by a firewall whether a first packet should be admitted to a protected network;

receiving at an intrusion prevention system of the protected network a first reputation score for the first packet based upon a first source of the first packet, wherein the firewall is different from the intrusion protection system;

providing the first packet to a first one of a plurality of buffers of the intrusion prevention system, wherein each buffer is associated with a different range of reputation scores, and wherein the first reputation score for the first packet is within the range of reputation scores associated with the first buffer;

processing the first packet by a first one of a plurality of processing engines to determine if the first packet includes an exploit;

forwarding the first packet to the protected network when the first packet does not include the exploit;

determining by the firewall whether a second packet should be admitted to the protected network;

receiving at the intrusion prevention system a second reputation score for the second packet based upon a second source of the second packet; and bypassing the buffers in response to the second reputation score being greater than a first threshold, and forwarding the second packet to the protected network without processing the second packet by any of the processing engines;

wherein:
  each buffer is associated with a different range of quality of services of a plurality of quality of service; and
  providing the first packet to the first buffer is in further response to determining that the first packet has a first quality of service, wherein the first quality of service is within the range of quality of services associated with the first buffer.

15. The computer readable medium of claim 14, wherein:
providing the first packet to the first buffer is in further response to determining that the first reputation score is less than the first threshold and greater than a second threshold; and the method further comprises dropping the first packet when the first reputation score is lower than the second threshold.

16. The computer readable medium of claim 14, the method further comprising:
determining by the firewall whether a third packet should be admitted to the protected network;

receiving at the intrusion prevention system a third reputation score for the third packet based upon a third source of the third packet;

providing the third packet to a second one of the buffers, wherein the third reputation score for the third packet is within the range of reputation scores associated with the second buffer;

processing the third packet by a second one of the processing engines to determine if the third packet includes an exploit; and forwarding the third packet to the protected network when the third packet does not include the exploit.

17. The computer readable medium of claim 14, the method further comprising:
determining by the firewall whether a third packet should be admitted to the protected network;

receiving at the intrusion prevention system a third reputation score for the third packet based upon a second source of the second packet;

in response to determining that the third packet has a second quality of service, providing the third packet to a second one of the buffers, wherein the third packet is provided to the second buffer when the third reputation score is within the range of reputation scores associated with the second buffer and when the second quality of service is within the range of quality of services associated with the second buffer;

providing the third packet to a third one of the processing engines;

processing the third packet by the third processing engine to determine if the third packet includes the exploit; and forwarding the third packet to the protected network when the third packet does not include the exploit.

* * * * *